United States Patent [19]

Haraikawa et al.

[11] 4,055,238
[45] Oct. 25, 1977

[54] ANTI-SQUEAL DEVICE IN DISC BRAKE

[75] Inventors: Tetsuo Haraikawa, Funabashi; Hiroshi Ito, Yokohama, both of Japan

[73] Assignee: Tokico Ltd., Kawasaki, Japan

[21] Appl. No.: 663,228

[22] Filed: Mar. 3, 1976

[30] Foreign Application Priority Data

Mar. 3, 1975 Japan ................... 50-25731

[51] Int. Cl.² ........................................... F16D 65/00
[52] U.S. Cl. ................................. 188/73.5; 92/129; 188/217; 192/30 V; 192/85 AA
[58] Field of Search ............... 188/1 B, 72.4, 72.5, 188/73.5, 205 A, 217, 129, 369, 370; 92/129; 192/30 V, 85 AA

[56] References Cited

U.S. PATENT DOCUMENTS

| 3,186,518 | 6/1965 | Rodway | 188/72.4 |
| 3,722,634 | 3/1973 | Ogasawara et al. | 188/73.5 |
| 3,730,302 | 5/1973 | Ogawa et al. | 188/73.5 |
| 3,876,042 | 4/1975 | Borjesson | 188/73.5 |
| 3,881,576 | 5/1975 | Haraikawa et al. | 188/73.5 |
| 3,890,884 | 6/1975 | Tilberschlag | 188/217 |

FOREIGN PATENT DOCUMENTS 2,218,688  10/1973  Germany .......................... 188/73.5

Primary Examiner—Stephen G. Kunin
Assistant Examiner—Edward R. Kazenske
Attorney, Agent, or Firm—Wenderoth, Lind & Ponack

[57] ABSTRACT

A disc brake including a piston for urging a friction pad against one surface of a rotatable disc, in which a plate having a freedom of movement in radial directions is disposed between the piston and the friction pad for transmitting thrust from the piston to the friction pad.

1 Claim, 2 Drawing Figures

ANTI-SQUEAL DEVICE IN DISC BRAKE

This invention relates to a disc brake and, more particularly, to a device for reducing or eliminating the phenomenon of so called "brake squeal" in the disc brake.

One of the problems associated with the use of disc brakes is that of brake squeal. It has been discovered that one cause of brake squeal is that high frequency vibrations are caused in a friction pad and the associated actuator such as a hydraulic piston when the friction pad is applied to the disc, and that brake squeal is reduced or eliminated by allowing relative movement between the friction pad and the actuator.

The invention will be described further by way of example, with reference to the accompanying drawing, in which.

Figure 1:
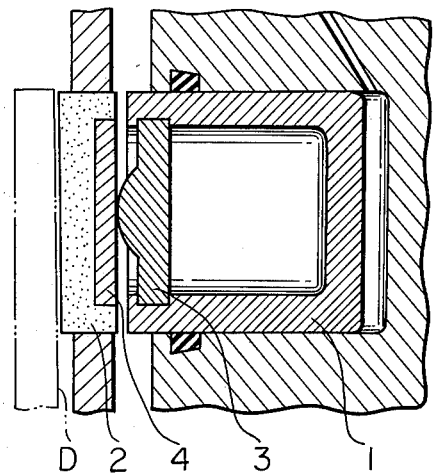
FIG. 1 is a fragmentary cross sectional view of a prior art disc brake.

A prior art disc brake illustrated in a fragmentary cross sectional in FIG. 1 comprises a hydraulic piston 1 for urging a friction pad 2 against one surface of a rotatable drum D. The piston 1 engages with the friction pad 2 through a plate 3 having a generally part-spherical projection thereon which abuts with a back plate 4 of the friction pad 2 so as to attain "point-contact" therebetween which accommodates inclination of the friction pad 2 caused from uneven wear of the friction material and prevents or reduces vibrations of the piston 1 which might be transmitted from the friction pad 2. However, a depression corresponding to the projection of the plate 3 will be formed in the back plate 4 when the disc brake has been used for a long period, and thereby the vibrations in the friction pad 2 in radial directions relative to the piston 1 will be transmitted to the piston 1 through the plate 3 causing brake squeal, which will not be observed when the brake pad 2 is substantially new.

The present invention provides a disc brake comprising a friction pad, a piston for urging the friction pad against one surface of a disc, and a plate having a projection thereon and being disposed between the piston and the friction pad with a freedom of movement in radial directions for reducing or eliminating brake squeal.

Figure 2:
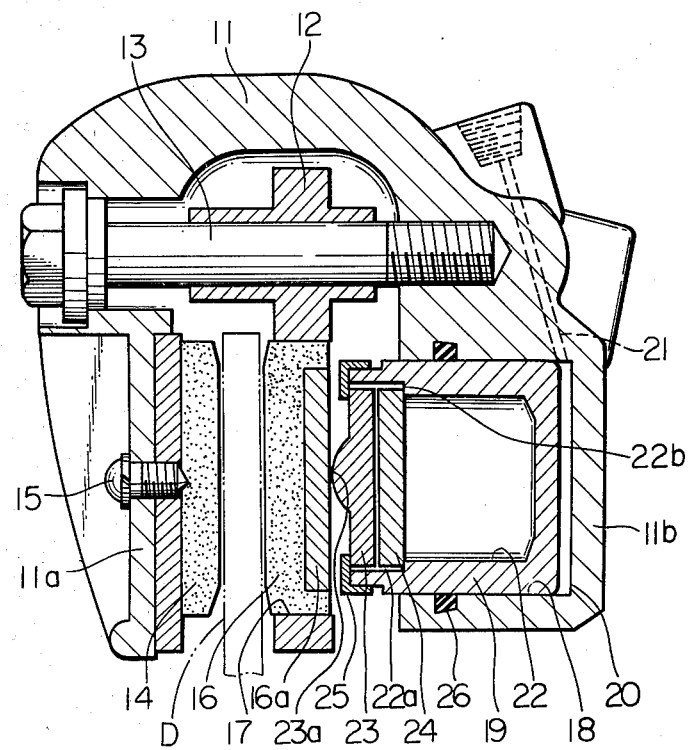
FIG. 2 is a cross sectional view of a disc brake exemplifying the present invention.

Referring to FIG. 2, the reference numeral 11 designates a brake calliper straddling a disc D and having two limbs 11a and 11b extending along opposite sides of the disc D. The calliper 11 is supported on a support member 12 fixed to a nonrotational part of a vehicle through bolts 13 and is slidable in the direction of the axis of the disc D. A friction pad 14 is nonrotatably mounted on the limb 11a, and is fixed thereon by means of a screw 15. A friction pad 16 is mounted in an opening 17 formed in the support member 12. The friction pad 16 has, for example, a configuration of a circle with cutout portions in the upper and lower side thereof as viewed from the side of the disc D, and the opening 17 is complementarily shaped, whereby, the friction pad 16 is axially slidably and nonrotatably supported in the opening 17.

The reference numeral 18 designates a cylinder formed in the other limb 11b for receiving a piston 19 therein. A liquid chamber 20 is defined in the cylinder 18 and is connected to a master cylinder (not shown) by means of an oil passage 21.

A stepped bore 22 is formed in the piston 19, and a plate 23 having a projection 23a is disposed in the large diameter portion 22a of the stepped bore 22. The outer diameter of the plate 23 is smaller than the inner diameter of the large diameter portion 22a in some degree, whereby a freedom of movement in radial directions of the piston 19 is provided on the plate 23. A spacer 24 is inserted between the plate 23 and a shoulder 22b at the step between the different diameter portions in the stepped bore 22, and a retainer 25 is secured on the piston 19 at the open end of the stepped bore 22 for preventing the plate 23 and the spacer 24 from falling out. An axial clearance is provided between the spacer 24 and the plate 23. The projection 23a of the plate 23 abuts against a back plate 16a of the friction pad 16 for transmitting thrust from the piston 19 to the friction pad 16. The reference numeral 26 denotes a seal member disposed between the piston 19 and the cylinder 18.

Now, a description will be given of the operation of the disc brake constructed as above described.

When a driver depresses a brake pedal, liquid under pressure flows from the master cylinder into the liquid chamber 20 and, the piston 19 is moved towards the disc D. The piston 19 urges the friction pad 16 against one surface of the disc D through the plate 23, and the calliper 11 slides on the support member 12 by means of reaction force, and the friction pad 14 is urged against the opposite surface of the disc D, thereby effecting braking action. When the brake pedal is released, the liquid under pressure in the liquid chamber 20 is returned to the master cylinder whereby, the piston 19 retracts by means of the rolling back effect of the seal member 26 and, the friction pads 14 and 16 retract by means of the knocking back effect of the disc D and, braking action is discontinued.

A depression corresponding to the projection 23a of the plate 23 will be formed in the back plate 16a of the friction pad 16 after the disc brake has been used for a long period, and vibrations in the radial directions of the piston 19 (in the directions of the radii of the piston 19) will be caused in the friction pad 16 during application of the brake. However, although the plate 23 will move with the friction pad 16 the vibrations will not be transmitted to the piston 19, thereby, brake squeal which might be observed in the prior art disc brakes will be reduced or prevented.

By applying grease or the like between the plate 23 and the spacer 24 or by applying a coating on the plate 23 at the position where the plate 23 contacts the piston 19 or the spacer 24, it is possible to reduce frictional resistance of the plate 23 further, thereby enhancing the antisqueal effects.

The description as given hereinbefore relates to one embodiment of the present invention; however, the present invention is by no means limited to the disc brake of the type as described, and is applicable to a disc brake of the type wherein a friction pad is actuated by a piston including the type having pistons on opposite sides of the disc.

As described above, the disc brake according to the present invention can reduce or eliminate brake squeal even though a depression is formed in the back plate of the friction pad, since the plate having a projection thereon can move radially with respect to the piston thereby prohibiting vibrations of the piston which might otherwise be transmitted thereto from the friction pad.

What is claimed is:

1. In a disc brake having a piston, a rotatable disc, and a friction pad having a back plate and urged against one surface of the rotatable disc by said piston, the improvement comprising a plate having a partially spherical projection on one surface thereof abutting the back plate of the friction pad, said piston having a stepped bore therein with a large diameter bore portion facing said back plate and a small diameter bore portion and a shoulder therebetween, said plate being in said large diameter bore portion and a predetermined clearance being left around the circumference of said plate between the large diameter bore portion and the outer circumference of the plate for permitting relative lateral movement between said plate and said large diameter bore portion, a generally flat spacer in said large diameter bore portion having one surface abutting said shoulder and the other surface being substantially flat and opposed to the other surface of said plate for transmitting thrust from the piston to substantially the entire surface of said plate and thence through said plate to said friction pad, a predetermined clearance being left around the circumference of said spacer and said large diameter bore portion for permitting relative lateral movement between said spacer and said large diameter bore portion, and a lubricant between the spacer and the plate.

* * * * *